United States Patent [19]

Azevedo

[11] 4,417,028
[45] Nov. 22, 1983

[54] PREAPPLIED PLASTIC FILM ADHESIVE COMPOSITION

[75] Inventor: Max Azevedo, Wethersfield, Conn.

[73] Assignee: Loctite Corporation, Newington, Conn.

[21] Appl. No.: 262,655

[22] Filed: May 11, 1981

[51] Int. Cl.³ .......................................... C08F 267/04
[52] U.S. Cl. .................... 525/285; 428/156; 428/157; 428/209
[58] Field of Search ............... 525/285; 428/156, 157, 428/209

[56] References Cited

U.S. PATENT DOCUMENTS

| | | | |
|---|---|---|---|
| 2,719,136 | 9/1955 | Caldwell | 525/285 |
| 3,300,547 | 1/1967 | Gorman | 525/285 |
| 4,007,322 | 2/1977 | House | 525/285 |
| 4,102,946 | 7/1978 | Imura | 525/285 |
| 4,108,943 | 8/1978 | Lee | 525/285 |
| 4,284,541 | 8/1981 | Takeda | 525/285 |

Primary Examiner—Melvyn I. Marquis
Attorney, Agent, or Firm—Walter J. Steinkraus; Eugene F. Miller

[57] ABSTRACT

This invention relates to a preapplied adhesive coating which can be deposited onto parts (e.g., nuts and bolts, slip-fitted tubing, or flanges), and left for long periods of time prior to use. The preapplied adhesive coating is dry to the touch, yet when the parts are assembled, the composition will cure between the parts, sealing and bonding them. The composition is comprised of a polymerizable monomer, a binder system, an initiator, and an accelerator of polymerization. The binder system is comprised of a copolymer of an anhydride and a compound selected from the group consisting of arylenes, alkylenes, alkarylenes, aralkylenes, alkoxyalkylenes, alkoxyarylenes, aryloxyalkylenes, and aryloxyarylenes.

This invention also concerns an article, particularly threaded fasteners and the like, which is coated with the preapplied adhesive coating.

22 Claims, No Drawings

PREAPPLIED PLASTIC FILM ADHESIVE COMPOSITION

BACKGROUND OF THE INVENTION

The concept of preapplied adhesives has long been recognized as a desirable object and numerous attempts have been made to provide such adhesives. For example, attempts have been made to encapsulate two-part adhesives, such as epoxides, and to apply them to parts prior to assembly. While this has permitted pre-application of adhesives to parts, totally acceptable results have not been achieved. The encapsulation process is quite cumbersome and the attachment of capsules presents certain inherent problems, such as risk of loss of the capsules from the surface during storage or shipment. Also, mistreatment prior to use can lead to loss of adhesive due to premature rupturing of the capsules.

One attempt to solve the problems of preapplied encapsulated adhesives was to affix a coating or sheet material which does not migrate or flow off parts prior to the time of assembly, e.g., during normal storage and shipment. Adhesives of this sort are disclosed in U.S. Pat. Nos. 3,547,851 and 3,625,875. These patents disclose non-flowable anaerobic sheets or coatings which can be preapplied to a part and which will provide a convenient means of bonding to a mating surface. Compositions of these references are particularly useful on threaded fasteners, where the adhesive provides increased holding power and resistance to loosening of the mating surface, e.g., as in the case of nuts wound on bolts.

It is known in the prior art to use a polymerizable acrylate ester, a peroxy initiator, an accelerator and an aqueous system comprised of polyvinyl alcohol (see U.S. Pat. Nos. 3,814,156 and 3,489,599). This preapplied coating, however, does not always produce adequate adhesion to the substrate and sometimes peels easily or flakes off the part to which it has been preapplied. The results is lower bond strengths when the coated part is mated with another part. Additionally, these prior art compositions tend to be surface-sensitive and peeling is especially likely on inactive surfaces such as zinc, cadmium, and dichromates. As a direct result of such failure of the preapplied films of these adhesives compositions to adhere adequately to substrates, only some of the composition would be left to provide adhesion to a mated part, which then results in low torque values between a nut and bolt which have been coated with the prior art preapplied compositions. A further problem encountered in the prior art compositions was the interference of the binding system, in most instances polyvinyl alcohol, with the cure of the monomer.

Accordingly, there is a need for a stable adhesive composition which can be prepared and preapplied conveniently to a variety of metallic as well as non-metallic surfaces prior to the time of assembly, which will remain on the parts during normal storage and shipment, and which will cure upon mating with another part thereby imparting an effective and improved seal or bond. It is also desirable to have such a composition which is resistant to heat aging, which has an extended pot-life, and which has a binder system which allows for proper deposition and adherence of the preapplied adhesive composition.

SUMMARY OF THE INVENTION

This invention relates to adhesive compositions which are useful as preapplied coatings, sealants, or films. The composition can be deposited on a substrate by any of the methods known in the art, such as tumbling, by hand, or application machines. The coated objects can then be shipped or stored for substantial periods of time prior to cure. Handling and shipping of parts coated with the preapplied composition is facilitated because the coatings are dry to the touch. Additionally, the instant compositions resist the peeling often encountered during storage or shipment of articles coated with the prior art compositions. The instant compositions are most useful as films applied to threaded articles such as fasteners, but other uses such as gasketing or bonding are contemplated. This invention also concerns an article coated with a preapplied adhesive composition, said preapplied adhesive composition being dry to the touch upon evaporation of the solvent (water) but which when crushed or ground by a mating surface, cures to a strong bond.

The preapplied adhesive compositions of this invention may be one- or two-part systems, the two-part being preferred. These compositions comprise: (a) a polymerizable monomer; (b) an initiator; and (c) an accelerator of polymerization; and (d) a binder, wherein the binder is a copolymer of the formula:

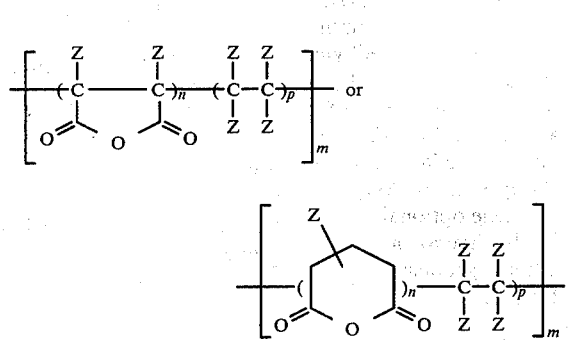

where Z is selected from the group consisting of H; $C_{1-10}$ alkyl, alkoxy, alkylene, cycloalkyl; cyano and halo; m is an integer from about 100–1,000; n is greater than 0 but less than 1; and p is 1−n. The specific binders of the instant invention, in combination with the other essential ingredients, give greatly improved preapplied compositions, which resist peeling and allow for stronger bonds upon cure of the adhesive. In the two-part embodiment, the free-radical initiator would be encapsulated in a suitable shell and would constitute one part, while the remaining essential ingredients, the monomer, binder, and accelerator, would constitute the second part. The microcapsule shell wall is preferably composed of a urea formaldehyde composition. The initiator-filled microcapsule would be added to the first part containing the monomer, accelerator and binder prior to deposition on a part.

DETAILED DESCRIPTION OF THE INVENTION AND ITS PREFERRED EMBODIMENTS

The polymerizable monomers useful in this invention include a wide variety of compounds which undergo polymerization reactions. Vinyl compounds, unsaturated polyesters, poly-and mono-functional acrylate esters are among the general classes of compounds which are contemplated for use. One preferred class of polymerizable monomers is the poly- and mono-functional acrylate and methacrylate esters of the general formulas:

where R is H, CH$_3$, C$_2$H$_5$ or Cl, and R$^1$ is C$_{1-8}$ mono-or bicycloalkyl, a 3 to 8-membered heterocyclic radical with a maximum of 2 oxygen atoms in the ring, H, alkyl, hydroxyalkyl or aminoalkyl where the alkyl portion is C$_{1-8}$ straight or branched carbon atom chain; and

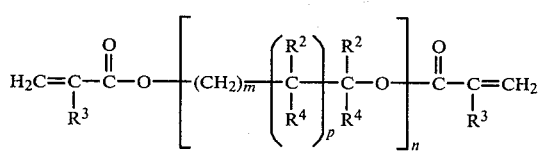

where R$^2$ is H, C$_{1-4}$ alkyl or hydroxyalkyl or —CH$_2$—OO=C—C(R$^1$)C=CH$_2$; R$^3$ is H, halogen or C$_{1-4}$ alkyl; R$^4$ is H, OH or —OO=C—C(R$^1$)=CH$_2$; m is an integer from 1 to 8; n is an integer from 1 to 20, and p is 0 or 1; R$^1$ is C$_{1-8}$ mono-or bicycloalkyl, a 3 to 8-membered heterocyclic radical with a maximum of 2 oxygen atoms in the ring, H, alkyl, hydroxyalkyl or aminoalkyl where the alkyl portion is C$_{1-8}$ straight or branched carbon atom chain.

Other preferred acrylate ester monomers are those selected from the class consisting of urethane acrylates having the general formula:

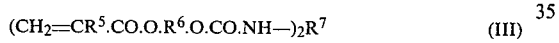

wherein R$^5$ is H, CH$_3$, C$_2$H$_5$ or Cl; R$^6$ is (i) a C$_{1-8}$ hydroxyalkylene or aminoalkylene group, (ii) a C$_{1-6}$ alkylamino-C$_{1-8}$ alkylene, a hydroxyphenylene, aminophenylene, hydroxynaphthylene or aminonaphthylene optionally substituted by a C$_{1-3}$ alkyl, C$_{1-3}$ alkylamino or di-C$_{1-3}$ alkylamino group; and R$^7$ is C$_{2-20}$ alkylene, alkenylene or cycloalkylene, C$_{6-40}$ arylene, alkarylene, aralkarylene, alkyloxyalkylene or aryloxyarylene optionally substituted by 1-4 halogen atoms or by 1-3 amino or mono- or di-C$_{1-3}$ alkylamino or C$_{1-3}$ alkoxy groups; or said acrylates having the general formula:

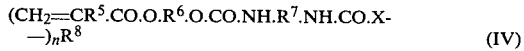

wherein R$^5$, R$^6$, and R$^7$ have the meanings given above; R$^8$ is the non-functional residue of a polyamine or a polhydric alcohol having at least n primary or secondary amino or hydroxy groups respectively; X is O or NR$^9$ where R$^9$ is H or a C$_{1-7}$ alkyl group; and n is an integer from 2 to 20.

Among the specific monofunctional polymerizable acrylate ester monomers preferred, and which correspond to the above formula I, are hydroxypropyl methacrylate, 2-hydroxyethyl methacrylate, methyl methacrylate, tetrahydrofurfuryl methacrylate, cyclohexyl methacrylate, 2-aminopropyl methacrylate and the corresponding acrylates.

Specific polyfunctional monomers which are preferred, and which correspond to formula II above, are polyethyleneglycol dimethacrylate and dipropylene glycol dimethacrylate.

Other preferred polymerizable acrylate ester monomers useful in the instant invention are selected from the class consisting of the acrylate, methacrylate and glycidyl methacrylate esters of Bisphenol A. The most preferred among all of the free-radical polymerizable monomers mentioned is ethoxylated Bisphenol-A-dimethacrylate.

Mixtures or copolymers of any of the above-mentioned free-radical polymerizable monomers can be employed.

Polymerizable vinyl monomers represented by the general formula:

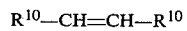

where R$^{10}$ is alkyl, aryl, alkaryl, aralkyl, alkoxy, alkylene, aryloxy, aryloxyalky, alkoxyaryl, or aralkylene, —OO=C—R$^1$, where R$^1$ is defined above, can also be effectively employed in the instant composition.

Copolymers or mixtures of monomers disclosed herein with other compatible monomers are also contemplated.

The binders of the instant compositions are generally copolymers formed by the reaction of an anhydride and a compound selected from the group consisting of arylenes, alkylenes, alkoxylenes, alkarylenes, aralkylenes, alkoxyalkylenes, alkoxyarylenes, aryloxyalkylenes and aryloxyarylenes.

The anhydrides useful in forming the copolymeric binders are of the formulas:

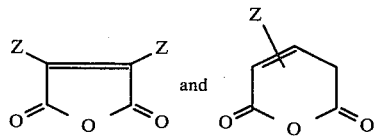

The copolymeric binders formed from this reaction are represented by the following formulas:

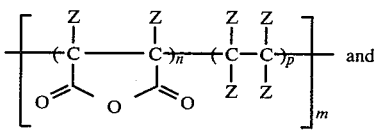

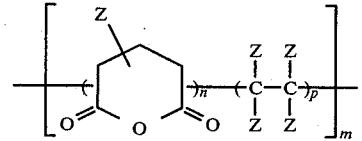

where Z is selected from the group consisting of H; C$_{1-10}$ alkyl, alkoxy, alkylene, cycloalkyl; cyano and halo; m is an integer from about 100–1,000; n is greater than 0 but less than 1; and p is 1−n.

The most preferred copolymeric binder is ethylene maleic anhydride. This particular copolymer is available under the trade names of EMA-21, EMA-31, EMA-61, EMA-91, and EMA-1103, among others, and manufactured by Monsanto Company, St. Louis, Missouri. The maleic anhydride copolymers are synthesized by reacting one mole of ethylene with one mole of maleic anhydride. According to Monsanto literature, linear as well as cross-linked grades of the resulting anhydride copolymers are available in a range of molecular weights, each of which has particular properties. For purposes of this invention, it has been found most useful to use a combination of linear and cross-linked grades, e.g., EMA-31 and EMA-91, respectively. The linear grades of the copolymer are generally very soluble in water, while the highly cross-linked grades become increasingly less soluble proportional to their molecular weight and typically form water gels. These copolymers are highly effective at altering the viscosity of water-based products whose final formulation may be a slurry, dispersion, or stable suspension. The preferred physical form of the instant invention is a dispersion of the monomer in the binder. Temperature and the addition of agents which affect pH can also be effective in controlling the viscosity of the solution. Of particular importance is the fact that the instant binders form stable suspensions or dispersions, keeping the monomer and binder from separating into their respective continuous phases for long periods of time at elevated temperatures.

Without wishing to be bound by any one theory, it is believed that the ethylene maleic anhydride binder helps to account for the improvement in the instant preapplied adhesive compositions and contributes to the adhesion of the preapplied film to a substrate through hydrolysis of the anhydride ring and subsequent exposure of its polar groups to the substrate surface. The instant compositions exhibit little or no peeling, once preapplied, and excellent adhesive strengths when mated with other parts.

The ratio of pendent polar groups to the total number of carbons in the backbone chain, as well as the relative position of these polar groups to each other and to a substrate surface, are believed to have an effect on the adhesion of the films and coatings to substrates, although the involved relationships have not been determined. Selection of appropriate ratios is considered to be a matter of routine experimentation within the skill of the art.

It is recommended that the pH of the instant adhesive compositions be kept in the general range of about 2 to about 12. The preferred range is about 4 to about 6. Adjustments to pH, particularly following hydrolysis of the anhydride ring, can be made by incorporating an effective amount of an organic or inorganic base. The instant adhesive compositions have optimum strengths on inactive surfaces, such as dichromates, cadmium and zinc, when the pH is about 4 to about 6. Two bases which are particularly useful in controlling pH and which do not interfere with the polymerization of the monomers are $NH_4OH$ and $NaOH$. The addition of a base to obtain a pH between about 4 to about 6 should be done for maximum adhesion of the preapplied composition to a substrate, and it is within the scope of the persons skilled in the art to do so.

The basic purpose of the binder is to support the monomer and other ingredients, allowing for easy deposition on a part. It is essential that the binder not interfere with the polymerization of the monomer. The binder should be at least partially soluble in water and preferably readily soluble. However, inasmuch as some binders of the instant invention will be more soluble than others, it is most useful and recommended that a combination of binders be used, one of which is a linear copolymer and the other a cross-linked copolymer. If such a combination is employed, it is preferred that they be used in a ratio of about 5 to about 1, more preferably about 2 to about 1, linear to cross-linked, respectively, and that they be of the same essential starting materials. Thus, for example, linear and crosslinked grades of ethylene maleic anhydride copolymers may be used.

Generally, the monomer, along with the accelerator of polymerization, is added to the binder which is at least partially in aqueous solution. The monomer, together with the accelerator are dispersed or suspended into small droplets in the binder.

The monomer droplet size must not be too small as to cause poor adhesion and subsequent peeling, not too big as to be unable to wet the substrate surfaces. Generally, the dispersed monomer droplets are in the size range of about 50 to about 500 microns and preferably about 100 to about 200 microns.

The upper limit of the monomer loading is determined by the point at which the phase of monomer dispersed in binder becomes reversed; that is, the point at which the amount of monomer is so great as to cause the binder to be dispersed in the monomer. At this upper limit, the monomer would no longer be supported by the binder and would run off parts when applied. Thus, the upper limit of monomer to be used is dependent, to some degree, on the specific monomer chosen. Generally, the upper limit of the amount of monomer would be about 35% to about 40% by weight. The viscosity of the adhesive composition as a whole must be within a range which allows easy deposition on parts through any of the known methods, e.g., tumbling, hand application, mechanical applicators, and which prevents the composition from migrating off parts.

Upon application of the adhesive composition to a part, the water in the composition is allowed to evaporate either at room temperature or under heat supplied by any of the conventional methods such as induction heat, convection heat, radiant heat, infra-red, or microwave. The resultant preapplied coating or film is dry to the touch once the water has been evaporated.

Generally, the Brookfield viscosity ratio range of the adhesive is between about 60,000 and about 100,000 at 2 RPM's and 18,000–36,000 at 20 RPM's, using a Brookfield RVF viscometer, a #6 spindle and measured at a temperature of 25° C. The binder, including its water solvent, is generally present in the instant compositions in the amount of about 60% to about 90% by weight of the composition, and preferably about 60% to about 70% by weight.

The invention will be further described in terms of free-radical polymerization. Initiators of free-radical polymerization useful in the instant composition include peroxides, hydroperoxides, peresters, and peracids. Peroxides are preferred and benzoyl peroxide is the most preferred. Such initiators are generally present in the adhesive composition in the amounts of about 0.1% to about 10% by weight of the monomer, and preferably about 0.1% to about 2.0% by weight. As previously mentioned, a two-part adhesive composition is preferred, one part composing an encapsulated initiator which is added to the dispersion prior to application of the adhesive composition to a part.

Commonly known accelerators of polymerization include amines and sulfimides. Tertiary amines, such as N,N-dimethylparatoluidine, and sulfimides such as 3-oxo-2,3-dihydrobenz-[d]isothiazole-1,1-dioxide, commonly known as saccharin, are particularly useful. However, the most preferred accelerators are organomettalic compounds, preferably organometallic polymers containing a metallocene moiety such as a ferrocene moeity. Suitable metallocenes in related compositions are disclosed more fully in U.S. Pat. No. 3,855,040. These metallocene compounds, as well as the accelerators mentioned above, are preferably added to the monomer in amounts of about 0.01% to about 1.0% by weight of the composition prior to forming the dispersion. Other metallo-containing materials which are nonpolymeric have also been found to be effective at these levels.

Inhibitors and chelators, well recognized in the art for imparting stability to polymerizable compositions, are recommended. It is preferred that they be added to the monomer prior to forming the dispersion. Those inhibitors useful in the present composition are usually selected from the group consisting of hydroquinones, benzoquinones, naphthoquinones, phenanthraquinones, anthraquinones, and substituted compounds of any of these. Among the chelators which may be optionally present in the adhesive composition are the beta-diketones, ethylenediamine tetraacetic acid (EDTA) and the sodium salt of EDTA. Both the inhibitors and chelators may be effectively employed in levels of about 0.1 to about 1% by weight of the monomer, without adversely affecting the speed of cure of the polymerizable adhesive composition.

Thickeners, plasticizers, pigments, dyes, diluents, fillers, and other agents common to the art can be employed in any reasonable manner to produce desired functional characteristics, providing they do not significantly interfere with the monomer polymerization.

The instant adhesive compositions exhibit a marked improvement over the prior art with regard to pot-life, e.g., shelf-life after the free-radical initiator has been added to the binder and monomer dispersion. The adhesive composition can be kept in this state for days or weeks without premature polymerization of the adhesive monomers.

Additionally, the preapplied adhesive compositions of the instant invention have improved resistance to heat aging.

The invention will be more fully understood by the following examples, which are not intended in any way to restrict the effective scope of the invention.

The preferred method of preparing the instant composition is to slowly mix the binder into deionized water which has been heated to a temperature of about 90° C. The binder is mixed until most of it is dissolved and the batch is clear and free from lumps. The batch is cooled to about 60° C. and the pH adjusted to between about 4 and about 6 by addition of NaOH.

The polymeric ferrocene compound is added, followed by 15 minutes of mixing and the same is done for the inorganic filler. Next the pigment is mixed in and finally the polymerizable monomer is added and the batch mixed at 25° C. until it is uniform and has the desired dispersion particle size distribution.

The above method was used for preparation of compositions A, B, and C of the examples. Composition D was prepared by methods known in the art for such systems (see U.S. Pat. Nos. 3,814,156, and 3,489,599). Compositions A, B, and C are preferred embodiments of the instant invention.

Table I shows the formulation of the compositions A, B, and C, as well as that of control composition D, which is a composition using the prior art binder polyvinyl alcohol.

EXAMPLE I

Table II, below, gives the torque values (break/prevail) in pounds-inches of preapplied coatings on a variety of metal nuts and bolts. The bolts were coated manually by rolling them in the adhesive composition. The water was then evaporated off. By "break" is meant the force required to break a bond and cause first motion of the nut relative to the bolt. By "prevail" is meant the force required to rotate the nut at the point 180° C. of arc past the point of "break." "Prevail" is thus a measure of the toughness of the cured composition and its ability to resist being ground up in the threads once the nut has been broken loose from the bolt.

The instant compositions represented by Compositions A, B, and C show higher values than Composition D, particularly on inactive surfaces such as ZN (zinc), CD (cadmium) and treated surfaces such as DM (Dacromet), PS (Polyseal), and ZD (zinc dichromate).

TABLE I

| | Composition - % by weight | | | |
|---|---|---|---|---|
| Ingredient | A | B | C | D (control) |
| $H_2O$ | 47 | 52 | 52 | 57.24 |
| EMA-31[1] | 4.3 | 3.9 | 4.2 | — |
| EMA-91[2] | 1.4 | 1.3 | 1.4 | — |
| PVA[3] | — | — | — | 3.6 |
| Polymeric Ferrocene cmpd. | 0.04 | 0.03 | 0.04 | 0.5 |
| Filler | 5.8 | 5.2 | 5.6 | — |
| Pigment | 1.4 | 1.3 | 1.4 | 2.33 |
| EBPMA[4] | 40 | 36 | 35 | 36 |
| Kelzan[5] | — | — | — | 0.78 |

[1] Monsanto Co. trade name for linear copolymer ethylene maleic anhydride.
[2] Monsanto Co. trade name for crosslinked copolymers of ethylene maleic anhydride.
[3] Polyvinyl alcohol.
[4] Ethoxylated Bisphenol A dimethacrylate.
[5] Kelco Co. trade name for a high molecular weight linear polysaccharide thickener.

TABLE II

72 Hour Room Temperature Cure - Break/Prevail in inch-pounds on Various Metal Nuts & Bolts

| | P/O | STL | ZN | CD | DM | PS | ZDC | DP | SS | P/O Bolt Cu Nut |
|---|---|---|---|---|---|---|---|---|---|---|
| Composition A | 303/300 | 131/205 | 169/167 | 205/179 | 232/205 | 305/302 | 120/187 | 252/172 | 110/192 | 322/207 |
| Composition B | 274/364 | 176/262 | 196/130 | 174/139 | 202/245 | 351/360 | 92/180 | 231/157 | 77/172 | — |
| Composition C | 292/350 | 153/255 | 212/132 | 214/150 | 234/270 | 260/240 | 95/165 | 240/167 | 90/170 | — |
| Composition D | 220/61 | 79/51 | 60/20 | 102/40 | 150/160 | 120/60 | 75/52 | 145/69 | 72/175 | — |

TABLE II-continued

72 Hour Room Temperature Cure - Break/Prevail in inch-pounds on Various Metal Nuts & Bolts

| | P/O | STL | ZN | CD | DM | PS | ZDC | DP | SS | P/O Bolt Cu Nut |
|---|---|---|---|---|---|---|---|---|---|---|
| (control) | | | | | | | | | | |

P/O—Phos & oil ⅜ × 16
STL—Steel ⅜ × 16
ZN—Zinc ⅜ × 16
CD—Cadmium ⅜ × 16
DM—Dacromet ⅜ × 16
PS—Polyseal ⅜ × 16
ZDC—Zinc dichromate 5/16 × 24
DP—Dry Phos M8 × 1.25
SS—Stainless Steel ⅜ × 16
P/O Bolt—Phos and oil bolt ⅜ × 16
Cu Nut—Copper Nut ⅜ × 16

EXAMPLE II

Tables III, and IV contain hot strength and cyclic heat resistance data, respectively, for each of the compositions tested. Nuts and bolts, coated with preapplied compositions in the manner same as in Example I, were again used as specimens to test break/prevail values. The bolts were coated with preapplied coatings and a nut was wound onto the bolt and allowed to cure at room temperature for 72 hours before subjecting the specimen to temperatures indicated in the tables. Both tables show the instant invention (A-C) has good resistance to high temperatures, and that it is significantly improved over the polyvinyl alcohol system on the inactive metal surfaces.

72 hours. The torque value results on various metal nuts and bolts are reported in Table V. The same procedure was used for testing the prior art composition D.

A comparison of the break/prevail values for the instant compositions A, B, and C with the prior art composition D shows significant improvement in strength in the instant composition over the prior art.

The effect of high temperature and moisture upon the preapplied coating was also tested. Bolts were coated with the compositions indicated in Table VI and subjected for 5 days to an atmosphere of 100% relative humidity at 100° F. The results are shown in Table VI.

As demonstrated by this example, the instant compositions have shown improvements over the prior art in the resistance of the former to deterioration upon expo-

TABLE III

Hot Strength: 72 Hours, Room temperature cure, 3 Hours at 300° F.;
Tested at 300° F.
Break/Prevail, Inch-Pounds

| | P/O | STL | ZN | CD | DM | PS | ZD | DS |
|---|---|---|---|---|---|---|---|---|
| Composition A | 252/220 | 70/202 | 82/255 | 95/172 | | | | |
| Composition B | 195/220 | 105/202 | 80/137 | 67/132 | | | | |
| Composition C | 240/255 | 97/240 | 85/245 | 57/180 | 162/177 | 283/306 | 172/105 | 67/180 |
| Composition D (control) | 129/72 | 32/37 | 45/55 | 35/80 | | | | |

TABLE IV

Cyclic Heat Resistance
72 Hours Room Temperature Cure; 1 Hour at 300° F.;
Tested at Room Temperature
Break/Prevail in Inch-pounds

| | P/O | STL | ZN | CD | DM | PS | ZDC | DP |
|---|---|---|---|---|---|---|---|---|
| Composition A | 300/305 | 77/322 | 135/290 | 97/292 | | | | |
| Composition B | 382/332 | 105/315 | 87/316 | 82/215 | | | | |
| Composition C | 332/407 | 102/262 | 82/225 | 75/260 | 190/250 | 307/317 | 80/242 | 275/27 |
| Composition D (control) | 232/205 | 60/40 | 65/56 | 44/95 | | | | |

EXAMPLE III

In this example, the intention was to determine if the preapplied coatings of the instant compositions would remain stable and in the uncured state on metal parts after storage for long periods of time. Tests which accelerate the apparent age of the preapplied coatings were conducted on bolts having the preapplied coatings by subjecting them to a temperature of 140° C. for 5 days (Table V). The purpose of these tests was to determine if aging, particularly in warm environments, would result in loss of the composition's strength upon cure, and to investigate the possibility of premature polymerization. Each coated bolt was cooled, mated with a nut, and allowed to cure at room temperature for sure to heat and moisture and would be expected to have a high lifetime in the preapplied, uncured state.

TABLE V

Heat Aging of Uncured Coated Bolt for 5 days at 140° C.
Bolt was then mated with nut, cured at room temperature
for 72 hours, and tested at room temperature
Break/Prevail in Inch-pounds

| | P/O | STL | ZN | CD |
|---|---|---|---|---|
| Composition A | 385/392 | 160/267 | 262/275 | 212/323 |
| Composition B | 282/315 | 147/335 | 210/313 | 220/247 |
| Composition C | 367/397 | 147/342 | 215/287 | 207/270 |
| Composition D (control) | 160/65 | 99/65 | 71/22 | 152/67 |

TABLE VI

Aging of Uncured Coated Bolt for 5 days
100% Relative Humidity, 100° F.
Test Assembled Nut and Bolt at Room Temperature
After Room Temperature Cure for 72 Hours
Break/Prevail in Inch-pounds

|  | P/O | STL | ZN | CD | DM | PS | ZDC | DP |
|---|---|---|---|---|---|---|---|---|
| Composition A | 232/295 | 125/272 | 127/180 | 152/202 |  |  |  |  |
| Composition B | 241/335 | 142/315 | 150/212 | 141/162 |  |  |  |  |
| Composition C | 302/325 | 125/207 | 155/205 | 230/187 | 206/176 | 225/240 | 77/147 | 157/130 |
| Composition D (control) | 225/135 | 90/87 |  | 167/100 | 142/135 |  |  |  |

Batches of Composition A and B were found to have a pot-life at room temperature for more than five weeks without premature cure or suspension stability problems. However, Composition D, using the polyvinyl alcohol binder of the prior art, had a pot-life of less than 24 hours. Break/Prevail tests on nuts and bolts were conducted on compositions A and B after the batch was left standing for 3 days. The results are tabulated in Table VII, below.

TABLE VII

Suspension Stability Test
3 Days, Break/Prevail in inch-pound at room temperature

|  | P/O | STL | ZN | CD |
|---|---|---|---|---|
| Composition A | 285/325 | 153/305 | 212/215 | 155/90 |
| Composition B | 279/288 | 175/265 | 212/245 | 185/105 |
| Composition D (control) | Stability less than 24 hours | | | |

Table VIII shows a qualitative comparison of the instant invention with various other binding systems experimented with during the development. As evidenced by the title, the cure strengths and adhesion capability of the applicant's invention is significantly improved over those shown.

TABLE VIII

Properties of Ethylene Maleic Anhydride Binder in Comparison With Other Selected Film Formers in The Instant Invention

| Trade Name | Chemical Synonyms | Cure Strength 24 Hrs. Room Temp. | Adhesion to surface |
|---|---|---|---|
| Gantrez Es Resin #225 GAF Corporation | Alkyl Monoester of Polymethyl vinyl ether | 40 in. lbs. break 40 in. lbs. prevail | good |
| Amphomer Resin National Starch Chemical Corp. | Acrylic resin | 70 in. lbs. break 40 in. lbs. prevail | poor |
| Stepanhold R-1 Stepan Chemical. Corp. | PVP/ethyl methacrylate/methacrylic acid terpolymer | 150 in. lbs. break 20 in. lbs. prevail | poor |
| Combination of PVA[1] and Rhoplez N619 Rohm & Haas Co. | Polyvinyl acetate acrylic copolymer | 60 in. lbs. break 50 in. lbs. prevail | good |
| Combination of PVA[1] and carboset B. F. Goodrich | Polyvinyl acetate acrylic resin | Low values[2] | poor, peeling |
| Ethocel The Dow Chem. Co. | ethyl cellulose resin | Low values on[2] zinc surface | poor, peeling |
| Veegum R. T. Vanderbilt Co. | Magnesium Aluminum silicate | Low values on[2] steel surface | poor peeling |
| Klucel J Hercules Inc. | Hydroxypropyl cellulose | Low values[2] | poor, peeling |
| Arolon 557 Ashland Chem. | Acrylic emulsion | Low values[2] | poor, tacky, peeling |
| EMA-31 EMA-91 | Ethylene Maleic anhydride | 292 in. lbs. break 350 in. lbs. prevail | excellent |
| Methocell cellulose #1500 natrosol 250 Hercules Inc. | Methyl cellulose hydroxyethyl cellulose hydroxyethyl ether cellulose | Low values[2] | poor, peeling |

[1] Polyvinyl Alcohol
[2] Between 0 to 50 in-lbs.

We claim:
1. An aqueous based adhesive composition, being particularly useful for forming a preapplied adhesive coating or film on parts, especially threaded parts, the composition comprising a dispersion in water of:
 (a) a polymerizable monomer;
 (b) a binder at least partly soluble in water;
 (c) an initiator; and
 (d) an accelerator of polymerization; wherein the binder is a copolymer of the formula:

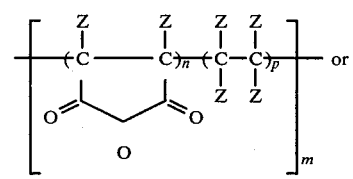

-continued

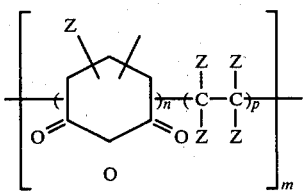

where Z is selected from the group consisting of: H; $C_{1-10}$ alkyl, alkoxy, alkylene, cycloalkyl; cyano and halo; m is an integer from about 100–1,000; n is greater than 0 but less than 1; and p is $1-n$.

2. An aqueous based adhesive composition comprising a dispersion in water of:
 (a) a polymerizable monomer;
 (b) a binder at least partly soluble in water;
 (c) an initiator; and
 (d) an accelerator of polymerization, wherein the binder is a copolymer formed by the reaction of an anhydride of the formula:

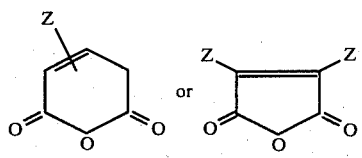

where Z is selected from the group consisting of: H; $C_{1-10}$ alkyl; alkoxy; alkylene; cycloalkyl; cyano; and halo, and a compound selected from the group consisting of arylenes, alkylenes, alkoxylenes, alkarylenes, arylalkylenes, alkoxyalkylenes, alkoxyarylenes, aryloxyalkylenes, and aryloxyarylene.

3. An adhesive composition according to claim 1 or 2, wherein the polymerizable monomer has the general formula:

$$CH_2=C(R).COOR^1 \qquad (I)$$

where R is H, $CH_3$, $C_2H_5$ or Cl, and $R^1$ is $C_{1-8}$ mono- or bicycloalkyl, a 3 to 8-membered heterocyclic radical with a maximum of 2 oxygen atoms in the ring, H, alkyl, hydroxyalkyl or aminoalkyl where the alkyl portion is $C_{1-8}$ straight or branched carbon atom chain.

4. The adhesive composition of claim 1 or 2, wherein the polymerizable monomer is selected from the class consisting of polyfunctional acrylate and methacrylate esters of polyhydric alcohols, having the general formula:

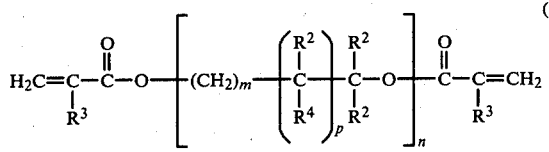

wherein $R^2$ is H, $C_{1-4}$ alkyl or hydroxyalkyl or $-CH_2-OO=C-C(R^1)C=CH_2$, $R^3$ is H, halogen or $C_{1-4}$ akyl, $R^4$ is H, OH or $-OO=C-C(R^1)=CH_2$, m is an integer from 1 to 8, n is an integer from 1 to 20, and p is 0 or 1, $R^1$ is $C_{1-8}$ mono- or bicycloalkyl, a 3 to 8-membered heterocyclic radical with a maximum of 2 oxygen atoms in the ring, H, alkyl, hydroxyalkyl or aminoalkyl where the alkyl portion is $C_{1-8}$ straight or branched carbon atom chain.

5. The adhesive composition of claim 1 or 2, wherein the polymerizable monomer is selected from the class consisting of acrylate, methacrylate and glycidyl methacrylate esters of Bisphenol-A.

6. The adhesive composition of claim 5, wherein the monomer is ethoxylated Bisphenol-A-dimethacrylate.

7. The adhesive composition of claim 1 or 2, wherein the polymerizable monomer is selected from the class consisting of urethane acrylates and substituted acrylate esters having the general formula:

$$(CH_2=CR^5.CO.O.R^6.O.CO.NH-)_2R^7 \qquad (III)$$

wherein $R^5$ is H, $CH_3$, $C_2H_5$ or Cl, $R^6$ is (i) a $C_{1-8}$ hydroxyalkylene or aminoalkylene group, (ii) a $C_{1-6}$ alkylamino-$C_{1-8}$ alkylene, a hydroxyphenylene, aminophenylene, hydroxynaphthylene or aminonaphthylene optionally substituted by a $C_{1-3}$ alkyl, $C_{1-3}$ alkylamino or di-$C_{1-3}$ alkylamino group, and $R^7$ is $C_{2-20}$ alkylene, alkenylene or cycloalkylene, $C_{6-40}$ arylene, alkarylene, aralkarylene, alkyloxyalkylene or aryloxyarylene optionally substituted by 1–4 halogen atoms or by 1–3 amino or mono- or di-$c_{1-3}$ alkylamino or $C_{1-3}$ alkoxy groups; or said acrylates having the general formula:

$$(CH_2=CR^5.CO.O.R^6.O.CO.NH.R^7.NH.CO.X-)_nR^8 \qquad (IV)$$

wherein $R^5$, $R^6$, and $R^7$ have the meanings given above, $R^8$ is the non-functional residue of a polyamine or a polyhydric alcohol having at least n primary or secondary amino or hydroxy groups respectively, X is O or $NR^9$ where $R^9$ is H or a $C_{1-7}$ alkyl group, and n is an integer from 2 to 20.

8. The adhesive composition of claim 3, wherein the polymerizable monomer is hydroxypropyl methacrylate or 2-hydroxyethyl methacrylate.

9. The adhesive composition of claim 3, wherein the polymerizable monomer is selected from the class consisting of acrylic acid, methyl methacrylate, tetrahydrofurfuryl methacrylate, cyclohexyl methacrylate, and 2-aminopropyl methacrylate.

10. The adhesive composition of claim 6, wherein the pH is about 2 to about 12.

11. The adhesive composition of claim 1 or 2, wherein the initiator is a free-radical initiator and is present in the amounts of about 0.1% to about 10% by weight of the monomer and is selected from the group consisting of peroxides, peresters, and peracids.

12. The adhesive composition of claim 11, wherein the free-radical initiator is benzoyl peroxide and is present in the amount of about 0.1 to about 2% by weight of the monomer.

13. The adhesive composition of claim 1 or 2, wherein the accelerator of polymerization is selected from the group consisting of amines, sulfimides, aldehyde-amine condensation products, non-polymeric ferrocene compounds, and polymeric ferrocene compounds.

14. The adhesive composition of claim 13 wherein the amine is N,N-dimethylparatoluidine, the sulfimide is saccharin, and the aldehyde-amine condensation product is butyraldehydeaniline.

15. The composition of claim 14, wherein there is included a dye or fluorescent pigment.

16. The adhesive composition of claim 15, wherein the composition contains an inhibitor in the amount of about 0.1% to about 1% by weight of the monomer, selected from the group consisting of hydroquinones, benzoquinones, naphthaquinones, phenanthraquinones, anthraquinones, and a substituted compound of any of the foregoing.

17. An article, coated with a film formed by evaporation of water from an adhesive composition, said composition comprising a dispersion in water of:
 (a) a polymerizable monomer;
 (b) a binder at least partly soluble in water;
 (c) an initiator; and
 (d) an accelerator of polymerization, wherein the binder is a copolymer of the formula:

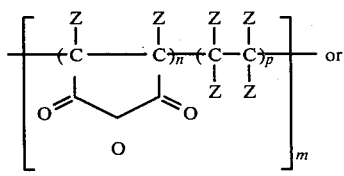 or

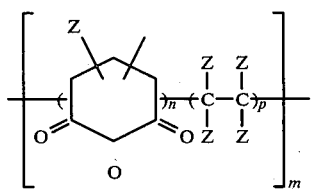

where Z is H, $C_{1-10}$ alkyl, alkoxy, alkylene, cycloalkyl; cyano, halo; m is an integer from about 100–1,000; n is greater than 0 but less than 1; and p is $1-n$.

18. The article of claim 17, wherein the adhesive composition is a dispersion in water of:
 (a) a polymerizable monomer;
 (b) a binder at least partly soluble in water;
 (c) an initiator;
 (d) an accelerator of polymerization selected from N,N-dimethylparatoluidine, saccharin and butyraldehyde-aniline condensation product;
 (e) a dye or fluorescent pigment; and
 (f) an inhibitor in the amount of about 0.1% to about 1% by weight, selected from the group consisting of hydroquinones, benzoquinones, naphthaquinones, phenanthraquinones, anthraquinones, and a substituted compound of any of the foregoing,
wherein the binder is a copolymer of the formula:

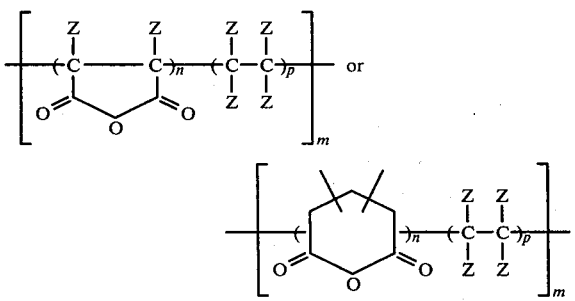

where Z is selected from the group consisting of: H, $C_{1-10}$ alkyl, alkoxy, alkylene, cycloalkyl, cyano, and halo; m is an integer from about 100–1,000; n is greater than 0 but less than 1; and p is $1-n$.

19. The article of claim 18, wherein the article is a threaded fastener.

20. The article of claim 19, wherein the adhesive composition additionally contains a chelator in the amount of about 0.1 to about 1% by weight of the monomer.

21. The adhesive composition of claim 16, wherein the composition additionally contains a chelator in the amount of about 0.1 to about 1% by weight of the monomer.

22. The adhesive composition of claim 10, wherein the pH is about 4 to about 6.

* * * * *